United States Patent
Li et al.

(10) Patent No.: US 9,806,312 B2
(45) Date of Patent: *Oct. 31, 2017

(54) LITHIUM ION BATTERY AND LITHIUM ION BATTERY PACK

(71) Applicants: Dongguan Amperex Technology Limited, Dongguan (CN); Ningde Amperex Technology Limited, NingDe (CN)

(72) Inventors: Wei Li, NingDe (CN); Shao gang Li, Dongguan (CN); Xue hui Wang, NingDe (CN); Qiong Qu, Dongguan (CN); Ru lai Cai, NingDe (CN)

(73) Assignees: Dongguan Amperex Technology Limited, Dongguan (CN); Ningde Amperex Technology Limited, NingDe (CN)

( * ) Notice: Subject to any disclaimer, the term of this patent is extended or adjusted under 35 U.S.C. 154(b) by 58 days.

This patent is subject to a terminal disclaimer.

(21) Appl. No.: 14/621,249

(22) Filed: Feb. 12, 2015

(65) Prior Publication Data

US 2016/0133900 A1 May 12, 2016

(30) Foreign Application Priority Data

Nov. 11, 2014 (CN) .......................... 2014 1 0636841

(51) Int. Cl.
*H01M 2/12* (2006.01)
*H01M 10/052* (2010.01)
(Continued)

(52) U.S. Cl.
CPC ....... *H01M 2/1241* (2013.01); *H01M 2/0237* (2013.01); *H01M 2/1247* (2013.01);
(Continued)

(58) Field of Classification Search
CPC ............ H01M 2/1247; H01M 2/1294; H01M 2/1264; H01M 2/127; H01M 2/1223;
(Continued)

(56) References Cited

U.S. PATENT DOCUMENTS

| 2008/0020268 A1* | 1/2008 | Hamada | H01M 2/0285 429/56 |
| 2012/0196162 A1* | 8/2012 | Shiraishi | H01M 2/1229 429/56 |

FOREIGN PATENT DOCUMENTS

CN 103474599 A 12/2013

OTHER PUBLICATIONS

ProQuest Dialog machine translation of Chen et al. (CN 103474599 A), published Dec. 25, 2013 and obtained on Aug. 26, 2016.*

* cited by examiner

*Primary Examiner* — Eli Mekhlin
(74) *Attorney, Agent, or Firm* — Alston & Bird LLP

(57) ABSTRACT

According to one embodiment of the present invention, a lithium ion battery having desirable safety performance is provided. The lithium ion battery includes a battery housing, a battery cover assembled to the battery housing, a pressure relief valve coupled to the battery housing and/or battery cover, and a safety device formed on the housing and/or battery cover and fixed to the pressure relief valve. The safety device includes a shielding plate facing the pressure relief valve, a side wall and an air flow channel structure. The side wall extends from the shielding plate and connects with the battery housing or the battery cover. The air flow channel structure is defined in the side wall.

14 Claims, 6 Drawing Sheets

(51) Int. Cl.
*H01M 2/02* (2006.01)
*H01M 10/0525* (2010.01)

(52) U.S. Cl.
CPC ....... *H01M 2/1264* (2013.01); *H01M 10/052* (2013.01); *H01M 10/0525* (2013.01); *H01M 2200/20* (2013.01); *H01M 2220/10* (2013.01); *H01M 2220/20* (2013.01)

(58) Field of Classification Search
CPC ............. H01M 2/1205; H01M 2/1241; H01M 2/1235; H01M 2/1229; H01M 2/12
See application file for complete search history.

LITHIUM ION BATTERY AND LITHIUM ION BATTERY PACK

CROSS-REFERENCE TO RELATED APPLICATION

The present patent application claims priority to Chinese patent application number CN 201410636841.1 filed on Nov. 11, 2014, which is incorporated by reference herein in its entirety.

TECHNICAL FIELD

The present invention relates to lithium ion batteries and, more particularly, relates to a lithium ion battery and a lithium ion battery pack having desirable safety performance.

BACKGROUND

At present, lithium ion batteries are becoming increasingly popular in electric vehicles and grid energy storage. Accordingly, more and more attention has been paid to the safety performance of lithium ion batteries. Generally, safety accidents of lithium ion batteries are caused by thermal runaway.

When thermal runaway occurs to a lithium in battery, heat generated by active materials in a lithium ion battery may reach hundreds of Joule/g, which may lead to intense oxidation-reduction reaction of the active materials and the electrolyte and further generate a large amount of flammable gases. The flammable gases generated may lead to sharp increase of pressure in the lithium ion battery and break the explosion-proof valve to generate high speed gas flow. The flammable gases ejecteded will mix with the surrounding air. At the same time, during the ejection of the flammable gases from the lithium ion battery, a large amount of high temperature solid parciles will be brought out. The solid particles may ignite the mixture of the flammable gases and the surrounding air, which may lead to ignition even explosion of the lithium ion battery.

Chinese patent publication number CN 103474599A discloses a lithium ion battery and a lithium ion battery pack having desirable safety performance. The lithium ion battery is equipped with a mesh member which defines a number of through holes extending therethrough. The mesh member can filter the high temperature solid particles, to seperate the high temperature solid particles from the inflammable gases. However, the mesh member disclosed in CN 103474599A at least has the following disadvantages. When thermal runaway occurs to a lithium ion battery, the mixture of the imflammable gases and the high temperature solid particles in the lithium ion battery will be ejected quickly. The through holes are only defined in the top section of the mesh member in the path of the gas ejection. If the through hole of the mesh member is too large, the high speed gas flow brings the high temperature solid particles out, which may lead to ignition or explosion of the lithium ion battery. In addition, if the through hole is too large, the strength of the mesh member is reduced, and the mesh member is apt to break under the impact of the high speed gas flow carrying the high temperature solid particles. If the through hole is too small, the gases cannot be discharged from the lithium ion battery timely. In addition, when thermal runaway occurs to the lithium ion battery, the melted plastic components, the solid particles in the gas flow or the melt slage may block the through holes, which will lead to sharp increase of pressure in the lithium ion battery and even explosion of the lithium ion battery.

In view of the foregoing, what is needed, therefore, is to provide a lithium ion battery and a lithium ion battery pack having desirable safety performance.

BRIEF SUMMARY OF VARIOUS EMBODIMENTS

One object of the present invention is to provide a lithium ion battery and a lithium ion battery pack having desirable safety performance.

According to one embodiment of the present invention, a lithium ion battery having desirable safety performance is provided. The lithium ion battery includes a battery housing, a battery cover assembled to the battery housing, and a pressure relief valve coupled to the battery housing and/or battery cover. The battery housing and/or the battery cover is coupled with a first safety device fixed to the pressure relief valve. The first safety device includes a shielding plate facing the pressure relief valve, a side wall and an air flow channel structure. The side wall extends from the shielding plate and connects with the battery housing or the battery cover, while the air flow channel structure is defined in the side wall.

According to one aspect of the present invention, the air flow channel structure is only defined in the side wall.

According to one aspect of the present invention, the air flow channel includes at least one opening, at least one through holes array, or at least one notch defined in the sidewall.

According to one aspect of the present invention, the air flow channel structure is a through holes array, each through hole in the through holes array has an area no less than 1 $mm^2$.

According to one aspect of the present invention, the shielding plate defines a number of through holes, and each through hole in the shielding plate has an area less than 1 $mm^2$.

According to one aspect of the present invention, the air flow channel structure includes a first air flow channel and a second air flow channel spaced apart from each other in the side wall. The first air flow channel is configured as an opening, a through holes array or a notch. The second air flow channel is configured as an opening, a through holes array or a notch. The first air flow channel and the second air flow channel have different structures.

According to one aspect of the present invention, the pressure relief valve defines pressure relief hole, and a total area of the air flow channel structure is no less than ½ of an area of the pressure relief hole.

According to one aspect of the present invention, the first air flow channel or the second air flow channel is a through holes array, each through hole in the through holes array has an area no less than 1 $mm^2$.

According to one aspect of the present invention, the lithium ion battery also includes a battery cell received in the battery housing. The first safety device is disposed between the battery cell and the battery cover. The first safety device has a height at least 1 mm less than a minimum distance between a surface of the battery cover facing the battery cell and the battery cell, a width no less 1 mm than a distance between two lateral inner surfaces of the battery housing, and a length at least 1 mm less than a minimum distance between positive and negative tabs of the battery cell.

According to one aspect of the present invention, the first safety device includes a connecting portion formed at one end of the side wall and spaced apart from the shielding plate. The side wall is connected to the battery housing or the battery cover via the connecting portion.

According to one aspect of the present invention, the lithium ion battery further includes a second safety device. The first safety device and the second safety device are seated at two sides of the pressure relief valve and cover the pressure relief valve, respectively. The second safety device includes a shielding plate facing the pressure relief valve, a side wall and an air flow channel structure. The side wall extends from the shielding plate and connects with the battery housing or the battery cover. The air flow channel structure is defined in the side wall and/or the shielding plate.

According to one aspect of the present invention, the first safety device is made from metal or inorganic non-metallic ceramic.

According to one aspect of the present invention, a surface of the first safety device is formed with a layer of Teflon® (polytetrafluoroethylene), epoxy resin, polyethylene terephthalate, polypropylene, phenolic resin or ceramic.

According to one embodiment of the present invention, a lithium ion battery pack is provided. The lithium ion battery pack includes a number of lithium ion batteries described previously connected in parallel and/or series.

According to the embodiments of the present invention, the side wall of the safety device of the lithium ion battery or lithium ion battery pack defines an air flow channel structure. The shielding plate of the safety device is seperated from the air flow channel structure. The shielding plate can block the solid spark particles effectively. The air flow channel structure on the side wall of the safety device can dischage the gas effectively. Therefore, explosion risk caused by pressure increase due to low exhaust efficiency is reduced, and the safety performance of the lithium ion battery is improved remarkably. At the same time, the shielding plate and the air flow channel structure at one side of the safety device can change the direction of the gas flow, so as to prevent the vertically ejected high speed gases from extensively mixing with the surrounding air and further improve the safety performance of the lithium ion battery.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF VARIOUS EMBODIMENTS

Figure 1:
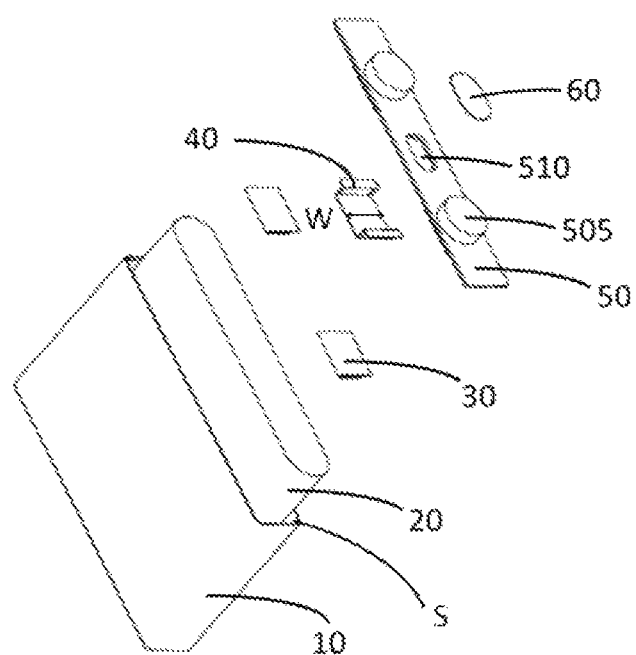
FIG. 1 depicts an examplary exploded view of a lithium ion battery according to a first embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 depicts an examplary exploded view of a lithium ion battery according to a first embodiment of the present invention. The lithium ion battery includes a battery housing 10, a battery cell 20 received in the battery housing 10, an electrolyte (not shown) filled in the battery housing 10, and a battery cover 50 coupled to the battery housing 10. The battery cover 50 is formed with a positive electrode post and a negative electrode post (hereinafter both numubered as 550). The positive electrode post and the negative electrode post 550 are electrically connected to a positive electrode and a negative electrode (not shown) of the battery cell 20 via a conductive connector 30, respectively. The battery cover 50 defines a pressure relief hole 510 between the positive electrode post and the negative electrode post 550. The pressure relief hole 510 is sealed with a pressure relief plate 60. The pressure relief plate 60 and the pressure relief hole 510 constitute a pressure relief valve.

More specifically, the pressure relief plate 60 is made from a same metal material as that of the battery cover 50, so as to avoid formation of an electrolytic cell with surrounding air or electrolyte due to potential difference between different kinds of metals and reduce the risk of corrosion reaction. In the embodiment as shown in FIG. 1, the pressure relief palte 60 is made from one of aluminum, aluminum alloy, nickel, nickel alloy or stainless steel. The pressure relief palte 60 has desirable ductility, and will not burst out when break to release the pressure. According to one embodiment of the present invention, the pressure relief palte 60 is coated with or bonded with a layer of corrosion-resistant material, such as PE and/or PP, so as to prevent the pressure relief palte 60 from being corroded by the electrolyte. According to another embodiment of the present invention, the pressure relief palte 60 is provided with a weakened line or a weakened area. The weakened line or the weakened area will first break when the pressure in the lithium ion battery exceeds a predetermined value, so as to control the break position of the pressure relief palte 60. According to one embodiment of the present invention, the threshold value of the pressure of the pressure relief palte 60 can bear is about 0.3~1.2 Mpa.

Referring to FIG. 1, the lithium ion battery includes a safety device 40 fixed to the pressure relief valve. The safety device 40 can be disposed on a lower surface of the battery cover 50 facing the battery cell 20 (as shown in FIG. 1), and is seated between the battery cover 50 and the battery cell 20. According to one embodiment of the present invention, along a direction from the battery cover 50 to the battery cell 20, the safety device 40 is disposed just blow the pressure relief plate 60.

Figure 2:
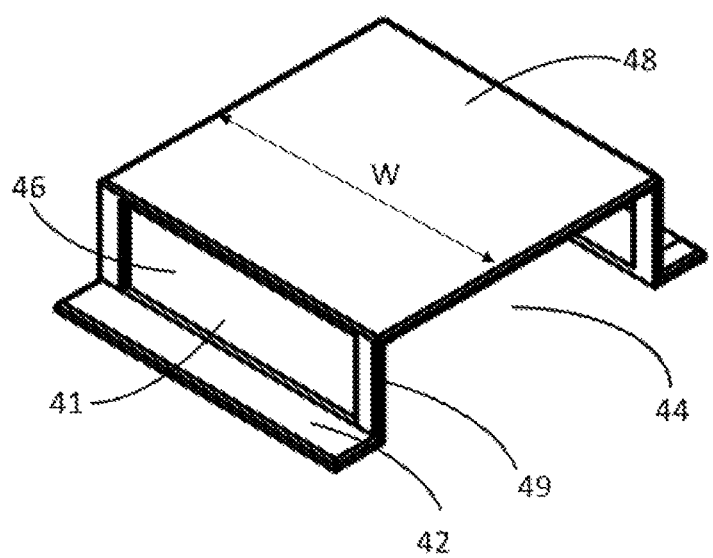
FIG. 2 depicts an examplary enlarged view of a safety device of the lithium ion battery as shown in FIG. 1.
Figure 3:
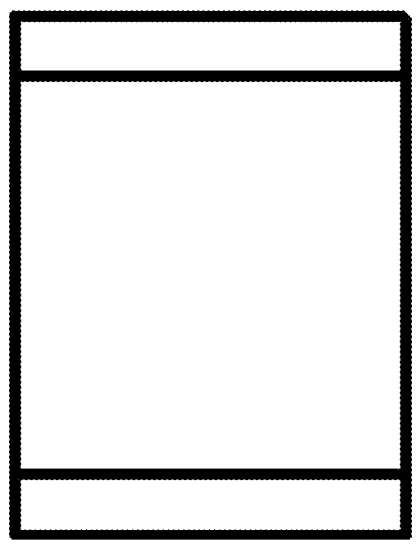
FIG. 3 depicts an examplary top view of the safety device as shown in FIG. 2.
Figure 4:
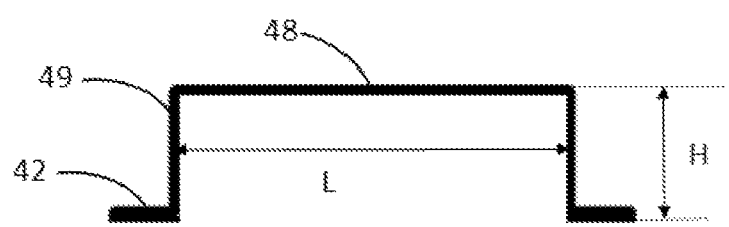
FIG. 4 depicts an examplary front view of the safety device as shown in FIG. 2.

Specifically, referring to FIGS. 2 to 4, the safety device 40 includes a shielding plate 48 facing the pressure relief valve, a side wall 49, a connecting porition 42, and an air flow channel structure 41.

According to one embodiment of the present invention, the shielding plate 48 covers the lower portion of the pressure relief plate 60, and a projected area of the shielding plate 48 on the pressure relief valve is no less than the area of the pressure relief valve, so as to prevent the ejected sparks from the front side effectively, and reflect the sparks to change the movement path and ejection speed of the sparks. In the embodiment as shown in FIG. 2, the shielding plate 48 does not define any through hole which can act as the air flow channel. In other words, the air flow channel structure is only defined in the side wall 49, so as to fully block the sparks from the front side, and reflect the sparks to change the movement path and the ejection speed of the sparks.

Figure 5:
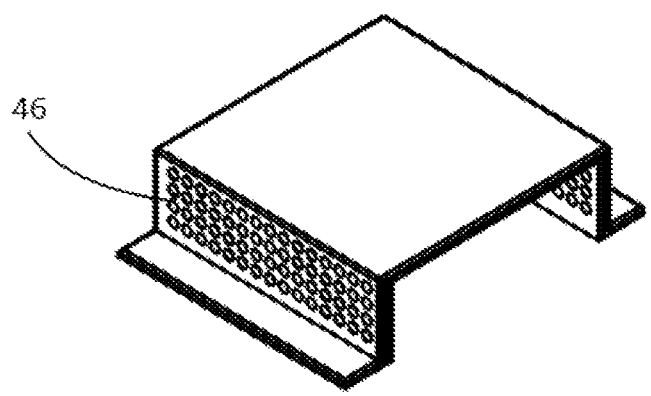
FIGS. 5 to 11 depict a number of examplary perspective views of various safety devices according to other embodiments of the present invention.

The side wall 49 is substaintially vertically or obliquely disposed on the shielding plate 48, and extends from the shielding plate 48 to the battery cover 50. The side wall 49 can be continuously disposed along one edge of the shielding plate 48 (as shown in FIGS. 6,7, 9,10), or can be discontinuously disposed along one edge of the shielding plate 48 (as shown in FIGS. 2,5,8). In the embodiment as shown in FIG. 2, the side wall 49 is discontinuously disposed along one edge of the shielding plate 48. The side wall 49 includes two lateral plates substaintially vertically or obliquely disposed on the shielding plate 48.

Figure 11:
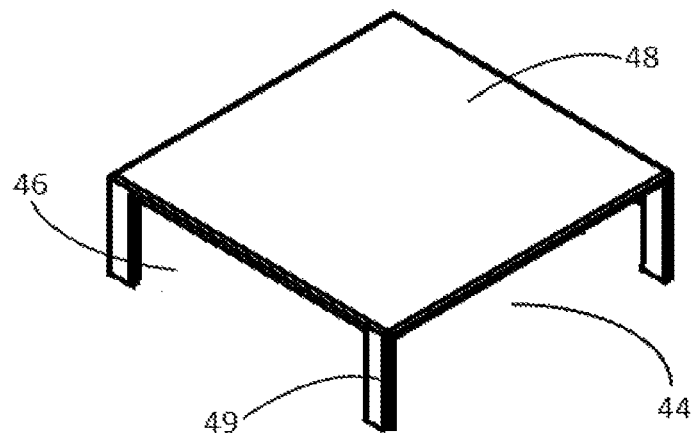

A connecting portion 42 is disposed at one end of the side wall 49 and is spaced from the shielding plate 48. The connecting portion 42 is fixed to the battery cover 50. The connecting portion 42 can be coupled to the battery cover 50 via stamping or molding, or can be fixed to the battery cover 50 via bonding, soldering, riveting, clamping, thread connecting, or snapping. According to a preferable embodiment of the present invention, the connecting portion 42 is fixed to the battery cover 50 via soldering, and the connecting tension therebetween is no less than 50N. If the connecting tension is too small, the safety device 40 may break off during the assembly of the lithium ion battery or in usage of the lithium ion battery due to vibration. As shown in FIG. 11, in actual use, the connecting portion 42 can also be omitted according to actual requirement. In this case, the side wall 49 can be directly fixed to the battery cover 50 via bonding, soldering or snapping.

The air flow channel stucture 41 is defined in the side wall 49. In the embodiment as shown in FIG. 2, the air flow channel structure 41 includes a first air flow channel 46 defined in a lateral plate of the side wall 49 and a second air flow channel 44 between the two lateral plates of the side wall 49. The first air flow channel 46 includes an opening structure defined in the lateral plate. The opening can be a rectangular hole shown in FIG. 2 or a hole having other shapes, so that the laterla plates substaintially presents as a frame. The total area of the opening structure is no less than half of that of the pressure relief hole 510. If the area is too small, when runaway occurs to the lithium ion battery, the gases in the lithium ion battery cannot be discharged timely. When the gas pressure in the lithium ion battery exceeds the strength of the battery housing, the battery housing may break and lead to explosion. The second air channel 44 can be a gap between the two lateral plates of the side wall 49. In other words, the side wall 49 is continously disposed along one edge of the shielding plate 48. The second air flow channel 44 is a notch defined in the side wall 49. That is, a portion of the side wall 49 between the two lateral plates, as well as between the distal end of the side wall 49 and the shielding plate 48 is cut off.

In actual use, the safety device 40 can be made from metal or inorganic non-metallic ceramic material. According to one embodiment of the present invention, the safety device 40 is made from metal material, such as aluminum, aluminum alloy, nickel, nickel alloy or stainless steel. The safety device 40 is made from a metal material as same as that of the battery cover 50, to prevent the battery housing from forming an electrochemical cell. under the condition of electrolyte and moist environment with different materials, and further effect the performance of the lithium ion battery. At least one surface of the safety device 40 facing the battery cell 20 (such as one surface of the safety device 40 afar from the pressure relief valve when the safety device 40 is seated between the battery cover 50 and the battery cell 20; or one surface of the safety device 40 facing the pressure relief valve when the safety device 40 is seated at an outer side of the battery cover 50) is coated with a layer of electrically insulative material, for instance, Teflon® (polytetrafluoroethylene), epoxy, polyethylene terephthalate (PET), phenolic resin, polypropylene(PP) or ceramic.

Referring to FIG. 4, in actual use, the height H between the connecting portion 42 of the safety device 40 and the shielding plate 48 is at least 1 mm less than the distance between the first surface of the battery cover 50 (for instance a lower surface of the battery cover 50) and the upper surface of the battery cell 20. If the height H is too large, the shielding plate 48 may press the positive plate and the negative plate in the battery cell 20, which may lead to deformation of the positive plate and the negative plate and even short-circuit the positive plate and the negative plate. The length L between the two lateral plates 49 of the safety device is at least 1 mm less than the minimum distance between the positive tab and the negative tab. If the length L is too large, the tabs may interfer with the boundary of the shielding plate 48 and the lateral plate 46, which may damage the tabs. As shown in FIGS. 1 and 2, the width W of the safety device 40 is at least 1 mm less than the distance between the two inner surfaces of the battery housing 10. If the width W is too large, the assembly of the battery cover 50 and the battery housing is affected.

In safety test of the lithium ion battery assembled in accordance with the embodiment as shown in FIG. 1, temperature in the lithium ion battery increases sharply and a large amount of gases are generated. In this case, the pressure relief plate 60 is ruptured and converted, to release the gases carrying the high temperature solid spark particles in the lithium ion battery. Due to the safety device 40 is covered with a pressure relief plate 60 at a below side thereof, the solid spark particles burst out are blocked by the shielding plate 48 of the safety device 40. The gases can be discharged out of the battery housing 10 via the first air flow channel 46 and the second air flow channel 44, so as to maintain the pressure relief function.

In this case, the solid spark particles burst out move along a straight line. When the solid spark particles burst out together with the gases arrive at the safety device 40, the solid spark particles are blocked by the shielding plate 48 of the safety device 40 and reflected back into the battery housing 10, thereby preventing the high temperature solid spark particles from ejecting out of the lithium ion battery with the high speed gases and igniting at the outside of the lithium ion battery. At the same time, when the high speed gases arrive at the safety device 40, due to the block of the shielding plate 48 of the safety device 40, the high speed gases will change the movement path and flow out via the first air flow channel 46, the second air flow channel 44 at the lateral side of the safety device 40, thereby lowering the speed of the gas flowing out of the lithium ion battery, reducing the distance of the gas bursting out of the lithium ion battery, reducing the contact area of the gas and the surrounding air, and reducing the risk of the ignition of the inflammable gases. In addition, the gases bursting out of the lithium ion battery with reduced ejection speed can reduce the risk of the ignition of the inflammable gases due to contact with other materials.

Compared with Chinese patent publication number CN 103474599A, according to one embodiment of the present invention, the safety device 40 is provided with a shielding plate 48 seperated from the first air flow channel 46 and the second air flow channel 44. The shielding plate 48 can effectively block the solid spark particles. The gases can be dischaged via the first air flow channel 46 and the second air flow channel 44 at a lateral side of the safety device 40. Consequently, risk of explosion due to high interal pressure caused by inadequate exhaust efficiency is reduced. At the same time, the flow direction of the gas can be changed via the shielding plate 48 and the first air flow channel 46, the second air flow channel 44 at a lateral side of the safety device 40, thereby preventing the high speed gas vertically ejecting out of the lithium ion battery and extensively mixing with the surrounding air. According to one embodiment of the present invention, the safety device 40 can seperate the high speed gas, such as inflammable gas and electrolyte steam, from the solid spark particles, thereby preventing the inflammable gas and the electrolyte steam from bursting out together with the solid spark particles and mixing with the surrounding air afar from the pressure relief valve and igniting. Filtration of the solid spark particles can effectively change the possible ignition manner of the lithium ion battery from being ignited by sparks to autogenously igniting of the gas. Physically, the temperature for igniting by sparks is less than 60° C., while the temperature for autogenous ignition of the gas is higher than 450° C. Therefore, safety performance of the lithium ion battery is improved remarkably.

In addition, compared with Chinese patent publication number CN103474599A, the shielding plate 48 according to one embodiment of the present invention is seperated from the first air flow channel 46 and the second air flow channel 44. The shielding plate 48 is located in the path of ejected gases and can effectively block the solid spark particles. The first air flow channel 46 and the second air flow channel 44 at a lateral side of the safety device 40 will not be directly impacted by the solid spark particles, or only be directly impacted by a small amount of the solid spark particles. Therefore, the sizes and shapes of the first air flow channel 46 and the second air flow channel 44 can be selected in a wide range, and the first air flow channel 46 and the second air flow channel 44 can hardly be blocked by the solid spark particles.

FIG. 5 depicts an examplary perspective view of a safety device according to another embodiment of the present invention. The safety device as illustrated in FIG. 5 is almost the same as that illustrated in FIG. 2 except that, in the embodiment as shown in FIG. 5, the first air flow channel 46 of the safety device includes a number of through holes in the side wall thereof, i.e. a through holes array. According to a preferred embodiment of the present invention, each through hole has an area no less than 1 mm$^2$, and the total area of the through holes is no less than ½ of the area of the pressure relief hole 510. The safety device as illustrated in FIG. 5 has a balanced sparks blocking effect and air discharging rate.

Figure 6:
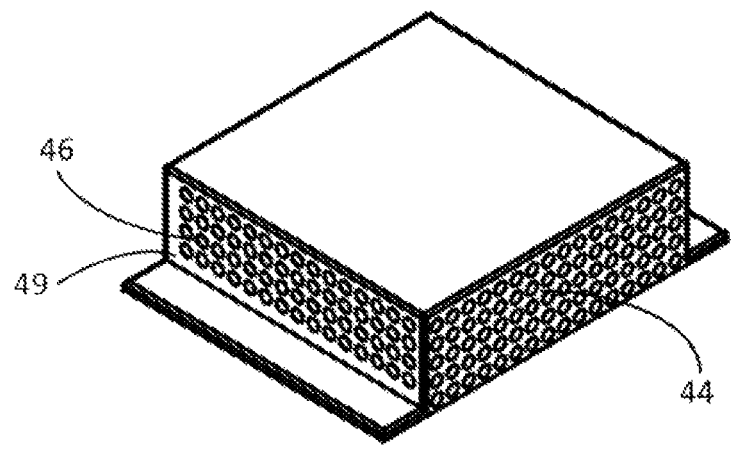

FIG. 6 depicts an examplary perspective view of a safety device according to another embodiment of the present invention. The safety device as illustrated in FIG. 6 is almost the same as that illustrated in FIG. 5 except that, the side wall 49 is continiously arranged along one edge of the shielding plate 48, and the second air flow channel 44 includes a number of through holes defined in the side wall. In other words, the first air flow channel 46 and the second air flow channel 44 each includes a number of through holes defined in the side wall. The shape of the through hole can be a circle, a diamond, a square, an oval or racetrack. Each through hole has an area no less than 1 mm$^2$. The total area of the through holes is no less than half of the area of the pressure relief hole 510. If the area of a single through hole is too small, the area of the air flow channel is hard to meet the requirement of actual use. In addition, the molten plastic components and solid particles are apt to block the through holes, which may cause the gases cannot be discharged timely and high pressure in the lithium ion battery. The first air flow channel 46 and the second air flow channel 44 can filter the sparks passing through the first air flow channel 46 and the second air flow channel 44 and seperate the sparks from the inflammable gas effectively.

Figure 7:
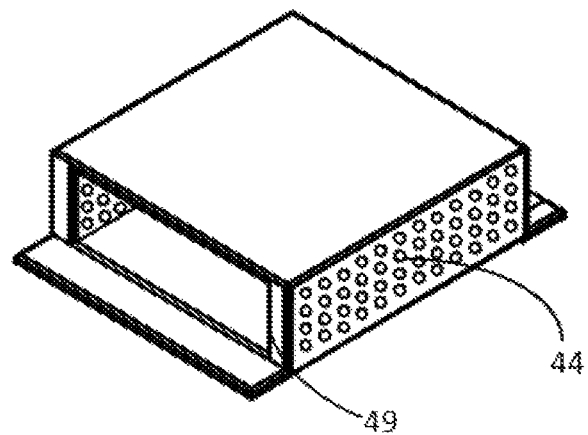
Figure 8:
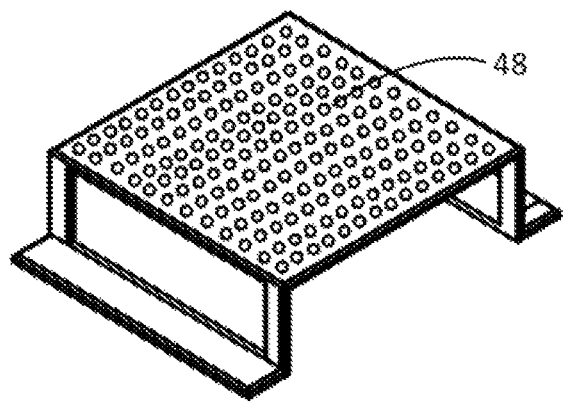

FIG. 7 depicts an examplary perspective view of a safety device according to another embodiment of the present invention. The safety device as illustrated in FIG. 7 is almost the same as that illustrated in FIG. 2 except that, in the embodiment as shown in FIG. 7, the side wall 49 of the safety device continiously disposed along one edge of the shielding plate 48, and the second air flow channel 44 includes a number of through holes defined in the side wall 49. According to one embodiment of the present invention, each through hole has an area no less than 1 mm$^2$. The total area of the through holes is no less than half of the area of the pressure relief hole 510. The safety device as illustrated in FIG. 7 has a balanced sparks blocking effect and air discharging rate.

FIG. 8 depicts an examplary perspective view of a safety device according to another embodiment of the present invention. The safety device illustrated in FIG. 8 is almost the same as that illustrated in FIG. 2 except that, in the embodiment as shown in FIG. 8, the shielding plate 48 defines a number of through holes. The through holes in the shielding plate 48 allow the pass of gases and prohibit the pass of the high temperature solid particles. According to one embodiment of the present invention, each through hole has an area less than 1 mm$^2$, thereby increasing the channel area of allowing the pass of the gas and reducing accumulation of pressure in the battery housing 10. If the area of a single through hole is too large, sparks having small diameters may pass through the through hole, which will affect the blocking effect.

Figure 9:
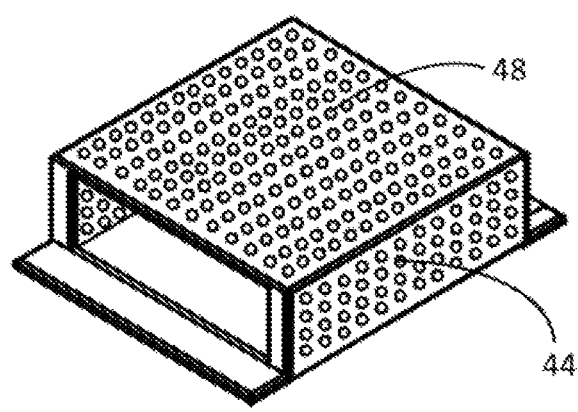

FIG. 9 depicts an examplary perspective view of a safety device according to another embodiment of the present invention. The safety device as illustrated in FIG. 9 is almost the same as that illustrated in FIG. 7 except that, in the embodiment as illustrated in FIG. 9, the shielding plate 48 defines a number of through holes. The through holes in the shielding plate 48 allow the pass of the gases and prohibit the pass of the high temperature solid particles. According to one embodiment of the present invention, each through hole has an area less than 1 mm$^2$, thereby increasing the channel area and allowing the pass of the gases and reducing accumulation of pressure in the battery housing 10. The safety device shown in FIG. 9 has a balanced sparks blocking effect and air discharging rate.

Figure 10:
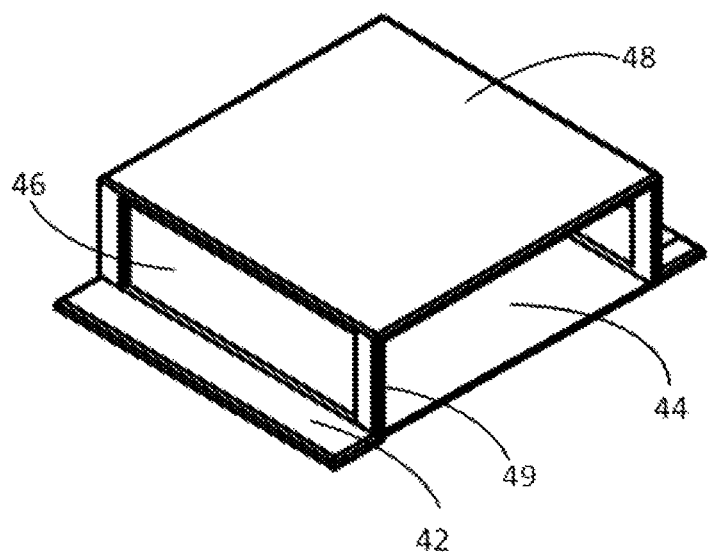

FIG. 10 depicts an examplary perspective view of a safety device according to another embodiment of the present invention. The safety device illustrated in FIG. 10 is almost the same as that illustrated in FIG. 2 except that, the side wall 49 of the safety device shown in FIG. 10 is continiously arranged along one edge of the shielding plate 48, and the second air flow channel 44 includes an opening structure defined in the side wall 49, such that the side wall 49 substaintially presents a frame shape. The safety device shown in FIG. 10 can strengthen the strength of the safety device.

Figure 12:
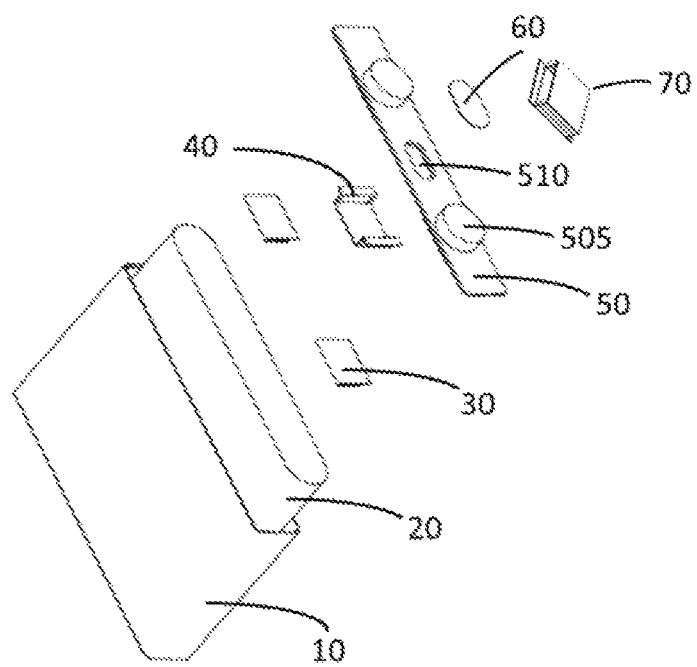
FIG. 12 depicts an examplary exploded view of a lithium ion battery according to another embodiment of the present invention.

FIG. 12 depicts an examplary explosed view of a lithium ion battery according to another embodiment of the present invention. The lithium ion battery as shown in FIG. 12 is almost the same as that illustrated in FIG. 1 except that, the lithium ion battery as shown in FIG. 12 includes a second safety device 70. The second safety device 70 and the first safety device 40 are disposed at two sides of the battery cover 50 and cover the pressure relief plate 60 respectively. The second safety device 70 has a same structure as any one of the safety devices 40 have been detailed in the embodiments as previously described. In addition, the air flow channel of the second safety device 70 can also be defined in the shielding plate 48 only. During the safety test of the battery cell 20, the first safety device 40 and the second safety device 70 both can protect the battery cell 20, thereby keeping the air channel smooth, enhancing the blocking effect to the solid spark particles, seperating the solid spark particles (i.e. inflammable gas) effectively, and ensuring the safety performace of the battery cell 20.

It should be understood that, in the embodiments as illustrated, the lithium ion batteries are square lithium ion batteries. However, there is no particular limitation to the shapes of the lithium ion batteries. The lithium ion battery can be any one lithium ion battery having other shapes, for instance a prismatic lithium ion battery or a cylindrical lithium ion battery. In addition, in the embodiments as illustated, although the present invention has been described in connojunction with the pressure relief plat, the safety device in accordance with the present invention can also be used in other lithium ion batteries. In addition, the safety device can be coupled to the battery housing 10 in a similar manner as described above, or be coupled to the battery housing 10 and the battery cover 50 respectively.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A lithium ion battery, comprising:
   a battery housing;
   a battery cover assembled to the battery housing; and
   a pressure relief valve coupled to the battery housing and/or battery cover;
   wherein:
   the battery housing and/or the battery cover is assembled with a first safety device fixed to the pressure relief valve,
   the first safety device comprises a shielding plate facing the pressure relief valve, a side wall and an air flow channel structure,
   the side wall has a longitudinal axis and extends from the shielding plate and connects with the battery housing or the battery cover, and
   the air flow channel structure is defined passing through the side wall along an axis perpendicular to the longitudinal axis.

2. The lithium ion battery of claim 1, wherein the air flow channel structure is only defined in the side wall.

3. The lithium ion battery of claim 1, wherein the air flow channel structure comprises at least one opening, at least one through holes array, or at least one notch defined in the side wall.

4. The lithium ion battery of claim 3, wherein the air flow channel structure is a through holes array, and each through hole in the through holes array has an area no less than 1 $mm^2$.

5. The lithium ion battery of claim 3, wherein the pressure relief valve defines a pressure relief hole, and total area of the air flow channel structure is no less than ½ of the area of the pressure relief hole.

6. The lithium ion battery of claim 1, wherein the shielding plate defines a plurality of through holes, and each through hole in the shielding plate has an area less than 1 $mm^2$.

7. The lithium ion battery of claim 1, wherein the air flow channel structure comprises a first air flow channel and a second air flow channel spaced apart from each other in the side wall, the first air flow channel is configured as an opening, a through holes array, or a notch, the second air flow channel is configured as an opening, a through holes array, or a notch, the first air flow channel and the second air flow channel have different structures.

8. The lithium ion battery of claim 7, wherein the first air flow channel or the second air flow channel is a through holes array, each through hole in the through holes array has an area no less than 1 $mm^2$.

9. The lithium ion battery of claim 1, further comprising a battery cell received in the battery housing, the first safety device is disposed between the battery cell and the battery cover, the first safety device has a height at least 1 mm less than a minimum distance between a surface of the battery cover facing the battery cell and the battery cell, a width no less 1 mm than a distance between two lateral inner surfaces of the battery housing, and a length at least 1 mm less than a minimum distance between positive and negative tabs of the battery cell.

10. The lithium ion battery of claim 1, wherein the first safety device comprises a connecting portion formed at one end of the side wall and spaced apart from the shielding plate, and the side wall is connected to the battery housing or the battery cover via the connecting portion.

11. The lithium ion battery of claim 1, further comprising a second safety device, the first safety device and the second safety device are seated at two sides of the pressure relief valve and cover the pressure relief valve respectively, the second safety device comprises a shielding plate facing the pressure relief valve, a side wall and an air flow channel structure, the side wall extends from the shielding plate and connects with the battery housing or the battery cover, and the air flow channel structure is defined in the side wall and/or the shielding plate.

12. The lithium ion battery of claim 1, wherein the first safety device is made from metal or inorganic non-metallic ceramic.

13. The lithium ion battery of claim 1, wherein a surface of the first safety device is formed with a layer of polytetrafluoroethylene, phenolic resin, polyethylene terephthalate, polypropylene, epoxy resin or ceramic.

14. A lithium ion battery pack, comprising a plurality of lithium ion batteries according to claim 1 connected in parallel and/or in series.

* * * * *